United States Patent
Morooka

(10) Patent No.: US 12,051,454 B2
(45) Date of Patent: Jul. 30, 2024

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventor: Atsushi Morooka, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/054,809

(22) Filed: Nov. 11, 2022

(65) Prior Publication Data

US 2023/0081800 A1   Mar. 16, 2023

Related U.S. Application Data

(63) Continuation of application No. PCT/JP2021/015987, filed on Apr. 20, 2021.

(30) Foreign Application Priority Data

May 14, 2020   (JP) ................................ 2020-084903

(51) Int. Cl.
   *G11B 5/71*   (2006.01)
   *G11B 5/66*   (2006.01)
   (Continued)

(52) U.S. Cl.
   CPC .......... *G11B 5/674* (2021.05); *G11B 5/70626* (2013.01); *G11B 5/714* (2013.01)

(58) Field of Classification Search
   CPC .............. C10M 105/54; C10M 105/58; C10M 105/60; C10M 105/72; C10M 171/00;
   (Continued)

(56) References Cited

U.S. PATENT DOCUMENTS 11,031,033 B2 *  6/2021  Terakawa ........... G11B 5/00817
2005/0217760 A1  10/2005  Hattori et al.
(Continued)

FOREIGN PATENT DOCUMENTS

JP        02-210615 A       8/1990
JP     2005-293702 A      10/2005
(Continued)

OTHER PUBLICATIONS

International Preliminary Report on Patentability with Translation of the Written Opinion of the International Searching Authority dated Nov. 15, 2022 in International Application No. PCT/JP2021/015987.
(Continued)

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium has an arithmetic average roughness Ra of a surface of a magnetic layer is 2.2 nm or less, a fluorine concentration A obtained by X-ray photoelectron spectroscopy performed on a surface of the magnetic layer at a photoelectron take-off angle of 10 degrees being 5 atom % or more and 50 atom % or less, and B, which is calculated by Equation 1 from an integrated intensity Ftotal of fragments derived from a fluorine-containing compound obtained for an entire region in a thickness direction of a cross section of the magnetic layer by line profile analysis of TOF-SIMS and an integrated intensity Fupper of fragments derived from a fluorine compound obtained for a region from the surface of the magnetic layer to an intermediate thickness in the thickness direction of the cross section, being 60% or more and 95% or less, Equation 1: $B=(Fupper/Ftotal)\times 100$.

17 Claims, 1 Drawing Sheet

(51) Int. Cl.
  *G11B 5/706* (2006.01)
  *G11B 5/714* (2006.01)
(58) Field of Classification Search
  CPC .... C10M 2215/003; C10M 2215/0425; C10M 2219/0406; C10M 159/12; G11B 5/84; G11B 5/7257; G11B 5/725
  See application file for complete search history.

(56) References Cited

U.S. PATENT DOCUMENTS

| | | |
|---|---|---|
| 2018/0025748 A1 | 1/2018 | Tano et al. |
| 2019/0295587 A1 | 9/2019 | Kasada |

FOREIGN PATENT DOCUMENTS

| | | |
|---|---|---|
| JP | 2006-294113 A | 10/2006 |
| JP | 6437392 B2 | 12/2018 |
| JP | 2019-169230 A | 10/2019 |
| JP | 2019-185844 A | 10/2019 |

OTHER PUBLICATIONS

Written Opinion of the International Searching Authority dated Jul. 27, 2021 in International Application No. PCT/JP2021/015987.
International Search Report dated Jul. 27, 2021 in International Application No. PCT/JP2021/015987.

* cited by examiner

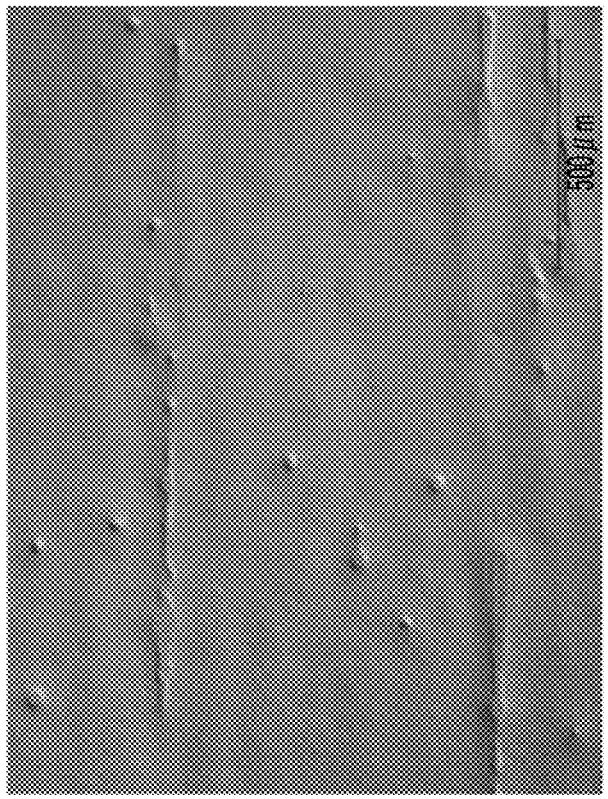
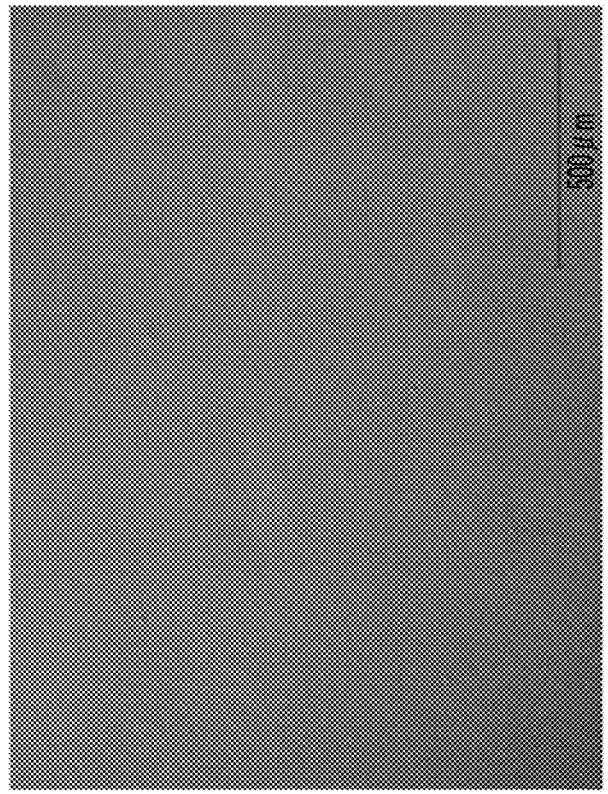

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application is a Continuation of PCT International Application No. PCT/JP2021/015987 filed on Apr. 20, 2021, which claims priority under 35 U. S.C. § 119(a) to Japanese Patent Application No. 2020-084903 filed on May 14, 2020. Each of the above applications is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

A magnetic recording medium has been widely used as a recording medium for recording various pieces of data (see, for example, JP6437392B).

SUMMARY OF THE INVENTION

It is desired that a magnetic recording medium exhibits excellent electromagnetic conversion characteristics. Examples of means for improving the electromagnetic conversion characteristics include increasing smoothness of a magnetic layer surface of a magnetic recording medium in order to reduce spacing loss. However, as the smoothness of the magnetic layer surface is increased, a friction coefficient tends to be high in a case where the magnetic layer surface and a magnetic head come into contact with each other to be slid on each other, for recording and/or reproducing data. Since a high friction coefficient may cause deterioration in running stability (for example, occurrence of sticking between the magnetic layer surface and the magnetic head) and/or scraping of the magnetic layer surface, it is desirable to reduce the friction coefficient. In the following, a low friction coefficient is also referred to as having excellent friction characteristics.

An object of one aspect of the present invention is to provide a magnetic recording medium having excellent electromagnetic conversion characteristics and friction characteristics.

One aspect of the present invention relates to a magnetic recording medium comprising: a non-magnetic support; and a magnetic layer containing a ferromagnetic powder, in which an arithmetic average roughness Ra of a surface of the magnetic layer is 2.2 nm or less, a fluorine concentration A obtained by X-ray photoelectron spectroscopy performed on the surface of the magnetic layer at a photoelectron take-off angle of 10 degrees is 5 atom % or more and 50 atom % or less, and B, which is calculated by Equation 1 from an integrated intensity Ftotal of fragments derived from a fluorine-containing compound obtained for an entire region in a thickness direction of a cross section of the magnetic layer by line profile analysis of time-of-flight secondary ion mass spectrometry (TOF-SIMS) and an integrated intensity Fupper of fragments derived from a fluorine compound obtained for a region from the surface of the magnetic layer to an intermediate thickness in the thickness direction of the cross section, is 60% or more and 95% or less.

$$B = (Fupper/Ftotal) \times 100 \quad \text{(Equation 1)}$$

In one embodiment, a vertical squareness ratio of the magnetic recording medium may be 0.65 or more.

In one embodiment, the A may be 15 atom % or more and 50 atom % or less.

In one embodiment, the B may be 70% or more and 95% or less.

In one embodiment, the ferromagnetic powder may be a hexagonal ferrite powder.

In one embodiment, the hexagonal ferrite powder may be a hexagonal strontium ferrite powder.

In one embodiment, the hexagonal ferrite powder may be a hexagonal barium ferrite powder.

In one embodiment, the ferromagnetic powder may be an ε-iron oxide powder.

In one embodiment, the magnetic recording medium may further comprise a non-magnetic layer containing a non-magnetic powder between the magnetic layer and the non-magnetic support.

In one embodiment, the magnetic recording medium may further comprise a back coating layer containing a non-magnetic powder on a surface side of the non-magnetic support opposite to a surface side on which the magnetic layer is provided.

In one aspect, the magnetic recording medium may be a magnetic tape.

Another aspect of the present invention relates to a magnetic tape cartridge comprising the magnetic recording medium described above.

Still another aspect of the present invention relates to a magnetic recording and reproducing device comprising the magnetic recording medium described above.

According to one aspect of the present invention, it is possible to provide a magnetic recording medium having excellent electromagnetic conversion characteristics and friction characteristics. In addition, according to one aspect of the present invention, it is possible to provide a magnetic tape cartridge and a magnetic recording and reproducing device including the magnetic recording medium.

BRIEF DESCRIPTION OF THE DRAWINGS

FIG. 1 shows an example of film quality evaluation results of magnetic layers of Examples and Comparative Examples.

DESCRIPTION OF THE PREFERRED EMBODIMENTS

[Magnetic Recording Medium ]

One aspect of the present invention relates to a magnetic recording medium including a non-magnetic support, and a magnetic layer containing a ferromagnetic powder. In the magnetic recording medium, an arithmetic average roughness Ra of a surface of the magnetic layer is 2.2 nm or less, a fluorine concentration A obtained by X-ray photoelectron spectroscopy performed on the surface of the magnetic layer at a photoelectron take-off angle of 10 degrees is 5 atom % or more and 50 atom % or less, and B, which is calculated by Equation 1 from an integrated intensity Ftotal of fragments derived from a fluorine-containing compound obtained for an entire region in a thickness direction of a cross section of the magnetic layer by line profile analysis of TOF-SIMS and an integrated intensity Fupper of fragments derived from a fluorine compound obtained for a region from the surface of the magnetic layer to an intermediate thickness in the thickness direction of the cross section, is 60% or more and 95% or less.

Hereinafter, a method for measuring Ra, A, and B will be described.

The arithmetic average roughness Ra of the surface of the magnetic layer in the present invention and the present specification is a value measured with an atomic force microscope (AFM) in a region of an area of 40 μm×40 μm on the surface of the magnetic layer. The measurement is performed 5 times at each of three different measurement positions. From measurement results obtained at the three measurement positions, an arithmetic average of measured values excluding a minimum value and a maximum value from Ra's obtained by the measurement performed at each measurement position 5 times (that is, three measured values of one measurement position, nine measured values in a total of the three measurement positions) is adopted as the arithmetic average roughness Ra of the surface of the magnetic layer of the magnetic recording medium to be measured. In the present invention and the present specification, the "magnetic layer surface (surface of the magnetic layer)" has the same meaning as a surface of the magnetic recording medium on a magnetic layer side. The following measurement conditions can be used as an example of the measurement conditions. The arithmetic average roughness Ra of the surface of the magnetic layer shown in Examples described below is a value obtained by measurement under the following measurement conditions.

The region of the area of 40 μm×40 μm on the surface of the magnetic layer of the magnetic recording medium is measured with an AFM (Nanoscope 4 manufactured by Veeco Instruments, Inc.) in a tapping mode. RTESP-300 manufactured by BRUKER is used as a probe, a scan speed (probe movement speed) is set to a speed at which one screen (512 pixel×512 pixel) is measured in 341 seconds.

"A" in the present invention and the present specification is a fluorine concentration obtained by X-ray photoelectron spectroscopy performed on the surface of the magnetic layer at a photoelectron take-off angle of 10 degrees.

"X-ray photoelectron spectroscopy" is an analysis method generally also called electron spectroscopy for chemical analysis (ESCA) or X-ray photoelectron spectroscopy (XPS). In the following, X-ray photoelectron spectroscopy will also be referred to as ESCA. ESCA is an analysis method using a phenomenon of photoelectron emission in a case where a surface of a sample to be measured is irradiated with X-rays, and is widely used as an analysis method for a surface layer portion of the sample to be measured. According to ESCA, qualitative analysis and quantitative analysis can be performed using X-ray photoelectron spectroscopic spectra obtained by analysis on the surface of the sample to be measured. Generally, the following expression holds between a depth from the sample surface to the analysis position (hereinafter, also referred to as a "detection depth") and a photoelectron take-off angle (take-off angle): detection depth≈average free path of electrons×3×sinθ. In the expression, the detection depth is a depth at which 95% of photoelectrons constituting X-ray photoelectron spectroscopic spectra are generated, and θ is a photoelectron take-off angle. From the expression described above, it can be seen that, as the photoelectron take-off angle decreases, the analysis regarding a shallow part of the depth from the sample surface can be performed, and as the photoelectron take-off angle increases, the analysis regarding a deep part of the depth can be performed. In the analysis performed by ESCA at a photoelectron take-off angle of 10 degrees, an extremely outermost surface layer portion extending from the sample surface to a depth of about several nm is usually an analysis position. Therefore, according to the analysis performed by ESCA on the surface of the magnetic layer of the magnetic recording medium at a photoelectron take-off angle of 10 degrees, it is possible to perform composition analysis regarding the extremely outermost surface layer portion extending from the surface of the magnetic layer to the depth of about several nm.

The fluorine concentration A is a proportion of fluorine atoms F to total (based on atom) 100 atom % of all elements detected by the qualitative analysis performed by ESCA. A region for the analysis is a region having an area of 300 μm×700 μm at a random position of the surface of the magnetic layer of the magnetic recording medium. The qualitative analysis is performed by wide scan measurement (pass energy: 160 eV, scan range: 0 to 1200 eV, energy resolution: 1 eV/step) performed by ESCA. Then, spectra of all the elements detected by the qualitative analysis are obtained by narrow scan measurement (pass energy: 80 eV, energy resolution: 0.1 eV, scan range: set for each element so that the entire spectra to be measured are included). An atomic concentration (unit: atom %) of each element with respect to all elements detected by the qualitative analysis is calculated from the peak surface area of each spectrum thus obtained. Here, an atomic concentration A of fluorine atoms is also calculated from the peak surface area of F1s spectra.

An arithmetic average of values obtained by performing the above-mentioned process at different positions of the surface of the magnetic layer of the magnetic recording medium three times is set as the fluorine concentration A. In addition, a specific aspect of the above process will be shown in Examples described below.

"B" in the present invention and the present specification is calculated by Equation 1 from an integrated intensity Ftotal of fragments derived from a fluorine-containing compound obtained for an entire region in a thickness direction of a cross section of the magnetic layer by line profile analysis of TOF-SIMS and an integrated intensity Fupper of fragments derived from a fluorine compound obtained for a region from the surface of the magnetic layer to an intermediate thickness in the thickness direction of the cross section.

As a pretreatment for performing the line profile analysis of TOF-SIMS, an obliquely cut surface including a cross section of the magnetic layer of the magnetic recording medium is formed. The obliquely cut surface is formed by cutting a cutting edge of a cutting device obliquely from the surface of the magnetic layer of the magnetic recording medium to at least a part of a portion (a non-magnetic layer in a case where the magnetic recording medium has a non-magnetic layer, and a non-magnetic support in a case where the magnetic layer is provided directly on the non-magnetic support) adjacent to the magnetic layer. The obliquely cut surface thus formed includes a cross section of the magnetic layer and a cross section of at least a part of a portion adjacent to the magnetic layer. The oblique cutting is performed such that a portion adjacent to the magnetic layer is exposed so that a portion adjacent to the magnetic layer can be analyzed in a region having a length of 100 μm or more in the line profile analysis. A penetration angle of the cutting edge into the surface of the magnetic layer of the magnetic recording medium may be, for example, in a range of 0.010 to 0.200 degrees. In Examples described below, the oblique cutting was performed by setting the penetration angle of the cutting edge into the surface of the magnetic layer of the magnetic recording medium to 0.115 degrees. As the cutting device, for example, an oblique cutting device called SAICAS (registered trademark) can be used. SAICAS is an abbreviation for surface and interfacial cutting analysis system, the SAICAS device may be, for example, a SAICAS device manufactured by Daipla Wintes Co., Ltd. and this device was used in Examples described below.

The line profile analysis of TOF-SIMS is performed on a continuous region extending from a region having a length of 100 μm on a surface (uncut portion) of the magnetic layer to the obliquely cut surface. As the TOF-SIMS device, for example, a TOF-SIMS device manufactured by ION-TOF or ULVAC-PHI, Inc. can be used. Regarding the measurement conditions, an ion beam diameter is set to 5 μm. The measurement mode of the TOF-SIMS includes a high mass resolution mode and a high spatial resolution mode. Here, as the measurement mode, a high mass resolution mode (also referred to as a bunching mode), which is a measurement mode in which a primary ion beam is bunched to perform measurement at a high mass resolution, is adopted. The line profile analysis is performed by setting an interval between measurement points to 2 μm.

Among various fragments obtained as analysis results of the line profile analysis of TOF-SIMS, a fluorine-based fragment for obtaining "B" is determined as follows. In a case where only one fluorine-based fragment is detected in the line profile analysis of TOF-SIMS in the region having a length of 100 μm on the surface (uncut portion) of the magnetic layer, the detected fluorine-based fragment is adopted as a fluorine-based fragment for obtaining "B". On the other hand, in a case where a plurality of fluorine-based fragments are detected in the line profile analysis of TOF-SIMS in the region having a length of 100 μm on the surface (uncut portion) of the magnetic layer, a fluorine-based fragment detected with the highest sensitivity is adopted as a fluorine-based fragment for obtaining "B". For example, in Examples described below, a $C_3OF_7^-$ fragment was adopted as a fluorine-based fragment for obtaining "B". In addition, in order to specify the region of the cross section of the magnetic layer from the region where the line profile analysis is performed, one component is selected from among components contained in a portion adjacent to the magnetic layer, and a fragment in which the selected component can be detected with the highest sensitivity is selected. The selection of such a fragment can be performed based on a well-known technology or the result of a preliminary experiment. For example, in Examples described below, phenylphosphonic acid, which is a component of the nonmagnetic layer, was selected as the above-described component, and a $PO_3^-$ fragment was selected as a fragment in which this component can be detected with the highest sensitivity.

An arithmetic average of fragment intensities of the fluorine-based fragments selected above is calculated for the region having a length of 100 μm on the surface (uncut portion) of the magnetic layer. Hereinafter, this arithmetic average will be referred to as [MF]. In addition, an arithmetic average of fragment intensities of the fragments selected above is calculated for a region having a length of 100 μm exposed to the obliquely cut surface in a portion adjacent to the magnetic layer. Hereinafter, this arithmetic average will be referred to as [MN]. From the result of the line profile analysis, a position where the fragment intensity of the fluorine-based fragment selected above is ½ times [MF] is specified as a position where oblique cutting is started (hereinafter, referred to as [point M]). In addition, a position where the fragment intensity of the fragment selected above is ½ times [MN] is specified as a position of an interface between the magnetic layer and a portion adjacent to the magnetic layer (hereinafter, referred to as [point K]). A region between the [point M] and the [point K] thus specified is specified as the magnetic layer, and an intermediate between the [point M] and the [point K] is specified as an intermediate thickness position (hereinafter, referred to as [point H]). Assuming that a thickness of the magnetic layer is T, the point H can be said to be a position where a depth from the surface of the magnetic layer is "T/2".

In the result of the line profile analysis, the integrated intensity of the fluorine-based fragment selected above, which is obtained for an entire range from the point M to the point K (that is, an entire range in the thickness direction of the cross section of the magnetic layer), is defined as "Ftotal". In addition, in the result of the line profile analysis, the integrated intensity of the fluorine-based fragment selected above, which is obtained for an entire range from the point M to the point H (that is, a region from the magnetic layer surface to the intermediate thickness in the thickness direction of the cross section of the magnetic layer), is defined as "Fupper". B is calculated by Equation 1 from the Ftotal and the Fupper thus obtained. The arithmetic average of the values of B obtained by forming the obliquely cut surface and performing the line profile analysis of TOF-SIMS at three randomly selected portions of the magnetic recording medium to be measured is defined as a value of B of the magnetic recording medium to be measured.

$$B=(\text{Fupper/Ftotal}) \times 100 \qquad \text{(Equation 1)}$$

The present inventor speculates as follows about the reason why the magnetic recording medium in which Ra, A, and B obtained as described above are in the range described above can exhibit excellent electromagnetic conversion characteristics and friction characteristics.

The fact that the arithmetic average roughness Ra of the surface of the magnetic layer is 2.2 nm or less can contribute to improvement of the electromagnetic conversion characteristics by reducing spacing loss.

In addition, A, which is obtained for the surface of the magnetic layer by the method described above, can be used as an index of the amount of fluorine present in the extremely outermost surface layer portion including the surface of the magnetic layer, and it can be considered that the larger the value of A, the more fluorine is present in the extremely outermost surface layer portion including the surface of the magnetic layer. It is speculated that the free energy of the surface of the magnetic layer is lowered due to the presence of a larger amount of fluorine, whereby the friction characteristics can be improved, and, it is considered that the friction coefficient during sliding between the magnetic layer surface and the magnetic head can be made smaller. Therefore, it is speculated that the fact that A, which is obtained for the surface of the magnetic layer by the method described above, is 5 atom % or more can contribute to improvement of the friction characteristics of the magnetic recording medium in which Ra is 2.2 nm or less. The present inventor considers that the fact that the A is 50 atom % or less can contribute to suppression of deterioration of the electromagnetic conversion characteristics. This is because it is considered that a small value of A may indicate a relatively large amount of the ferromagnetic powder.

Further, it can be said that the larger the value of B obtained for the magnetic layer by the method described above, the more the fluorine-containing compound is present in the region from the surface of the magnetic layer to the intermediate thickness (which can be referred to as an "upper layer region"). It is considered that in a case where a large amount of the fluorine-containing compounds in such an upper layer region can be attributed to strong interactions such as entanglement and/or chemical bonding between a component (for example, a binding agent described below) contained in the magnetic layer and the fluorine-containing compound. The present inventor speculates that this can contribute to suppression of an increase in friction coefficient due to the desorption of the fluorine-containing compound from the magnetic layer by sliding between the magnetic layer surface and the magnetic head. Therefore, the present inventor considers that B of 60% or more can lead to improvement of the friction characteristics. In addition, the present inventor speculates that B of 95% or less can contribute to formation of a magnetic layer having a more uniform film quality.

Note that the speculation made by the present inventor described above and thereafter is merely speculation and does not limit the present invention.

Hereinafter, the magnetic recording medium will be further described in detail.

<Arithmetic Average Roughness Ra of Surface of Magnetic Layer>

In the above magnetic recording medium, the arithmetic average roughness Ra of the surface of the magnetic layer is 2.2 nm or less and preferably 2.1 nm or less from the viewpoint of improving electromagnetic conversion characteristics, and the smaller the value of Ra is, the more preferable it is. Ra may be, for example, 1.0 nm or more, 1.2 nm or more, 1.5 nm or more, or 1.8 nm, and can be lower than the values exemplified above. Ra can be controlled by the manufacturing conditions of the magnetic recording medium (for example, calendering treatment conditions described below) and the like.

<Fluorine Concentration A>

In the above magnetic recording medium, A, which is obtained by the method described above, is 5 atom % or more, preferably 7 atom % or more, more preferably 10 atom % or more, and more preferably in the order of 12 atom % or more, 15 atom % or more, 17 atom % or more, 20 atom % or more, 22 atom % or more, 25 atom % or more, 27 atom % or more, and 30 atom % or more, from the viewpoint of improving the friction characteristics. From the viewpoint of improving the electromagnetic conversion characteristics, the A is 50 atom % or less, preferably 48 atom % or less, more preferably 45 atom % or less, still more preferably 43 atom % or less, and still more preferably 40 atom % or more.

<B Calculated by Equation 1>

In the magnetic recording medium described above, B, which is calculated by Equation 1 from Ftotal and Fupper obtained by the method described above, is 60% or more, preferably 65% or more, more preferably 70% or more, still more preferably 75% or more, and still more preferably 80% or more, from the viewpoint of improving the friction characteristics. From the viewpoint of enabling the formation of a magnetic layer having a more uniform film quality, the B is 95% or less, preferably 90% or less, and more preferably 85% or less.

Specific aspects of means for controlling A and B will be described below.

<Magnetic Layer>

(Ferromagnetic Powder)

The ferromagnetic powder contained in the magnetic layer of the magnetic recording medium can be preferably a ferromagnetic powder selected from the group consisting of a hexagonal ferrite powder and an ε-iron oxide powder. The hexagonal ferrite powder and the ε-iron oxide powder are said to be preferable ferromagnetic powders, from the viewpoint of improving the recording density of the magnetic recording medium. The magnetic layer of the magnetic recording medium can contain, for example, one kind alone or two or more kinds of ferromagnetic powders selected from the group consisting of a hexagonal ferrite powder and an ε-iron oxide powder.

It is preferable to use a ferromagnetic powder having a small average particle size as the ferromagnetic powder contained in the magnetic layer of the magnetic recording medium, from the viewpoint of improving the recording density. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of the magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

In one aspect, the magnetic recording medium can contain a hexagonal ferrite powder in the magnetic layer. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. A hexagonal cobalt ferrite powder refers to a powder in which a main divalent metal atom contained in this powder is a cobalt atom. The main divalent metal atom refers to a divalent metal atom that accounts for the most on atom % basis in the divalent metal atom contained in the powder. Note that a rare earth atom is not included in the above divalent metal atom. The "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

As the hexagonal ferrite powder, one kind or two or more kinds selected from the group consisting of a hexagonal strontium ferrite powder, a hexagonal barium ferrite powder, and a hexagonal cobalt ferrite powder can be used. From the viewpoint of improving the recording density of the magnetic recording medium, a hexagonal strontium ferrite powder is preferable.

Hereinafter, the hexagonal strontium ferrite powder, which is an aspect of the hexagonal ferrite powder, will be described in more detail. At least some of the matters described below for the hexagonal strontium ferrite powder may also be applied to the hexagonal barium ferrite powder and the hexagonal cobalt ferrite powder.

An activation volume of the hexagonal strontium ferrite powder is preferably in a range of 800 to 1600 $nm^3$. The finely granulated hexagonal strontium ferrite powder having an activation volume in the above range is suitable for producing a magnetic recording medium exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=$1.0 \times 10^{-1}$ $J/m^3$.

$$Hc=2Ku/Ms \{1-[(kT/KuV)\ln(At/0.693)]^{1/2}\}$$

[In the expression, Ku: anisotropy constant (unit: $J/m^3$), Ms: saturation magnetization (unit: kA/m), k: Boltzmann constant, T: absolute temperature (unit: K), V: activation volume (unit: $cm^3$), A: spin precession frequency (unit: $s^{-1}$), and t: magnetic field reversal time (unit: s)]

The anisotropy constant Ku can be used as an index for reducing thermal fluctuation, in other words, for improving the thermal stability. The hexagonal strontium ferrite powder preferably has Ku of $1.8 \times 10^5$ $J/m^3$ or more, and more preferably has Ku of $2.0 \times 10^5$ $J/m^3$ or more. Ku of the hexagonal strontium ferrite powder may be, for example, $2.5 \times 10^5$ $J/m^3$ or less. Note that since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 atom % with respect to 100 atom % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 atom % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 atom % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content>1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content>1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 atom % with respect to 100 atom % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is speculated that this is because the hexagonal strontium ferrite powder includes a rare earth atom with a bulk content in the above range, and rare earth atoms are unevenly distributed in a surface layer portion of a particle constituting the hexagonal strontium ferrite powder, whereby it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is speculated that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

It is speculated that the use of the hexagonal strontium ferrite powder having the rare earth atom surface layer portion uneven distribution property as the ferromagnetic powder of the magnetic layer contributes to the prevention of scraping of the surface on the magnetic layer side due to the sliding on the magnetic head. That is, it is speculated that the hexagonal strontium ferrite powder having the rare earth atom surface layer portion uneven distribution property can also contribute to the improvement of running durability of the magnetic recording medium. It is speculated that this may be because uneven distribution of rare earth atoms on a surface of a particle constituting the hexagonal strontium ferrite powder contributes to an improvement of interaction between the particle surface and an organic substance (for example, a binding agent and/or an additive) contained in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 atom %, still more preferably in a range of 1.0 to 4.5 atom %, and still more preferably in a range of 1.5 to 4.5 atom %.

The bulk content is a content obtained by totally dissolving hexagonal strontium ferrite powder. In the present invention and the present specification, the content of an atom contained in the hexagonal strontium ferrite powder refers to a bulk content obtained by totally dissolving the hexagonal strontium ferrite powder, unless otherwise noted. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more kinds of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder present as a powder, the partially and totally dissolved sample powder is collected from the same lot of powder. Meanwhile, for the hexagonal strontium ferrite powder contained in the magnetic layer of the magnetic recording medium, a part of the hexagonal strontium ferrite powder extracted from the magnetic layer is subjected to partial dissolution, and the other part is subjected to total dissolution. The hexagonal strontium ferrite powder can be extracted from the magnetic layer by a method disclosed in a paragraph 0032 of JP2015-91747A, for example.

The partial dissolution means that dissolution is performed such that, at the end of dissolution, the residue of the hexagonal strontium ferrite powder can be visually confirmed in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually confirmed in the solution.

The partial dissolution and measurement of the surface layer portion content are performed by the following method, for example. Note that the following dissolution conditions such as the amount of sample powder are exemplified, and dissolution conditions for partial dissolution and total dissolution can be adopted in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 Elemental analysis of the filtrated solution thus obtained is performed by an inductively coupled plasma (ICP) analyzer. In this way, the surface layer portion content of a rare earth atom with respect to 100 atom % of an iron atom can be obtained. In a case where a plurality of kinds of rare earth atoms are detected by elemental analysis, the total content of all rare earth atoms is defined as the surface layer portion content. This also applies to the measurement of the bulk content.

Meanwhile, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 atom % of an iron atom can be obtained.

From the viewpoint of increasing the reproduction output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m$^2$/kg or more, and may be 47 A·m$^2$/kg or more. On the other hand, from the viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe.

Regarding the content (bulk content) of a constituent atom of the hexagonal strontium ferrite powder, a strontium atom content may be, for example, in a range of 2.0 to 15.0 atom % with respect to 100 atom % of an iron atom. In one aspect, in the hexagonal strontium ferrite powder, the divalent metal atom included in this powder can be only a strontium atom. In another aspect, the hexagonal strontium ferrite powder may include one or more kinds other divalent metal atoms in addition to the strontium atom. For example, a barium atom and/or a calcium atom can be included. In a case where the other divalent metal atoms other than the strontium atom are included, a content of the barium atom and a content of the calcium atom in the hexagonal strontium ferrite powder respectively can be, for example, in a range of 0.05 to 5.0 atom % with respect to 100 atom % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structures may be detected by X-ray diffraction analysis. For example, according to one aspect, in the hexagonal strontium ferrite powder, only the M type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on atom % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 atom % with respect to 100 atom % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 atom % or less, more preferably in a range of 0 to 5.0 atom %, and may be 0 atom % with respect to 100 atom % of an iron atom. That is, in one aspect, the hexagonal strontium ferrite powder may not include atoms other than an iron atom, a strontium atom, an oxygen atom, and a rare earth atom. The content expressed in atom % is obtained by converting a content of each atom (unit: mass %) obtained by totally dissolving the hexagonal strontium ferrite powder into a value expressed in atom % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

ε-Iron Oxide Powder

In the present invention and the present specification, the term "ε-iron oxide powder" refers to a ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a method of manufacturing the ε-iron oxide powder, a producing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the manufacturing method of the ε-iron oxide powder capable of being used as the ferromagnetic powder in the magnetic layer of the magnetic recording medium is not limited to the methods described here.

An activation volume of the ε-iron oxide powder is preferably in a range of 300 to 1500 nm$^3$. The finely granulated ε-iron oxide powder having an activation volume in the above range is suitable for producing a magnetic recording medium exhibiting excellent electromagnetic conversion characteristics. The activation volume of the ε-iron oxide powder is preferably 300 nm$^3$ or more, and may be, for example, 500 nm$^3$ or more. In addition, from the viewpoint of further improving the electromagnetic conversion characteristics, the activation volume of the ε-iron oxide powder is more preferably 1400 nm$^3$ or less, still more preferably 1300 nm$^3$ or less, still more preferably 1200 nm$^3$ or less, and still more preferably 1100 nm$^3$ or less.

The anisotropy constant Ku can be used as an index for reducing thermal fluctuation, in other words, for improving the thermal stability. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Note that since higher Ku means higher thermal stability, which is preferable, a value thereof is not limited to the values exemplified above.

From the viewpoint of increasing the reproduction output in a case of reproducing data recorded on the magnetic recording medium, it is desirable that mass magnetization σs of the ferromagnetic powder included in the magnetic recording medium is high. In this regard, in one aspect, σs of the ε-iron oxide powder may be 8 A·m²/kg or more, and may be 12 A·m²/kg or more. On the other hand, from the viewpoint of noise reduction, σs of the ε-iron oxide powder is preferably 40 A·m²/kg or less and more preferably 35 A·m²/kg or less.

In the present invention and the present specification, average particle sizes of various powders are values measured by the following method using a transmission electron microscope, unless otherwise noted.

The powder is imaged at an imaging magnification of 100,000× with a transmission electron microscope, and the image is printed on photographic printing paper or displayed on a display so that the total magnification is 500,000×, to obtain an image of particles configuring the powder. The powder contained in the magnetic layer of the magnetic recording medium can be imaged using a cutting piece produced by the following method, and an image of the particles described above can be obtained. The magnetic recording medium adheres to a resin block or the like, a cutting piece is produced using a microtome or the like, and the produced cutting piece is observed with a transmission electron microscope to specify and image the magnetic layer portion. For example, for a tape-shaped magnetic recording medium (that is, a magnetic tape), the magnetic tape can be cut in a longitudinal direction to produce a cutting piece.

A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. Unless otherwise noted, the average particle size shown in Examples described below is a value measured by using transmission electron microscope H-9000 manufactured by Hitachi high-tech corporation as the transmission electron microscope, and image analysis software KS-400 manufactured by Carl Zeiss as the image analysis software, and the average particle volume of the ferromagnetic powder is a value calculated as a sphere-equivalent volume from the average particle size thus obtained. In the present invention and the present specification, the powder means aggregation of a plurality of particles. For example, ferromagnetic powder means aggregation of a plurality of ferromagnetic particles. Further, the aggregation of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of collecting sample powder from the magnetic recording medium in order to measure the particle size, a method disclosed in a paragraph 0015 of JP2011-048878A can be adopted, for example.

In the present invention and the present specification, unless otherwise noted, (1) in a case where the shape of the particle observed in the particle photograph described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. A high filling percentage of the ferromagnetic powder in the magnetic layer is preferable from the viewpoint of improvement of the recording density.

(Binding Agent)

The magnetic recording medium can be a coating type magnetic recording medium, and can include a binding agent in the magnetic layer. The binding agent is one or more kinds of resin. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-24113A can be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

(Curing Agent)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. At least a part of the curing agent is contained in the magnetic layer in a state of being reacted (crosslinked) with other components such as the binding agent, by proceeding the curing reaction in the magnetic layer forming step. The same applies to the layer formed using this composition in a case where the composition used to form the other layer includes a curing agent. In addition, this point is the same in a case where the fluorine-containing compound described below has a reactive group. The preferred curing agent is a thermosetting compound, and polyisocyanate is suitable for this. For details of the polyisocyanate, descriptions disclosed in paragraphs 0124 and 0125 of JP2011-216149A can be referred to. The content of the curing agent in a magnetic layer forming composition may be, for example, 0 to 80.0 parts by mass, and from the viewpoint of improving a strength of the magnetic layer, may be 50.0 to 80.0 parts by mass, with respect to 100.0 parts by mass of the binding agent.

(Additive)

The magnetic layer may include one or more kinds of additives, as necessary. As the additives, the curing agent described above is used as an example. In addition, examples of the additive which can be contained in the magnetic layer include a non-magnetic powder (for example, an inorganic powder or carbon black), a lubricant, a dispersing agent, a dispersing assistant, an antibacterial agent, an antistatic agent, an antioxidant, and the like. As the additive, a commercially available product or an additive manufactured by a well-known method can be appropriately selected and used according to the desired properties. For example, for the dispersing agent, a description disclosed in paragraphs 0061 and 0071 of JP2012-133837A can be referred to. In addition, examples of the dispersing agent include compounds containing a polyalkyleneimine chain and a polyester chain disclosed in JP2015-28830A. For details of such a compound, paragraphs 0026 to 0071 of JP2015-28830A and the description of Examples of the same publication can be referred to. Note that the above compound is an example, and various well-known additives can be used as the additive. The dispersing agent may be added to a non-magnetic layer forming composition. For the dispersing agent that can be added to the non-magnetic layer forming composition, a description disclosed in a paragraph 0061 of JP2012-133837A can be referred to.

Fluorine-Containing Compound

The magnetic recording medium preferably contains a fluorine-containing compound in a portion of the non-magnetic support on the magnetic layer side. In the present invention and the present specification, the term "portion on the non-magnetic support on the magnetic layer side" refers to a magnetic layer in a case of a magnetic recording medium including the magnetic layer directly on the non-magnetic support, and refers to a magnetic layer and/or a non-magnetic layer in a case of a magnetic recording medium including the non-magnetic layer between the non-magnetic support and the magnetic layer, which will be described in detail below. Hereinafter, the term "portion on the non-magnetic support on the magnetic layer side" is also simply described as a "portion on the magnetic layer side". The presence on the surface of the magnetic recording medium on the magnetic layer side is also included in the inclusion in the portion on the magnetic layer side. Since the fluorine-containing compound can function as a lubricant and can contribute to reduction in friction coefficient during sliding between the surface of the magnetic recording medium on the magnetic layer side and the magnetic head, the fluorine-containing compound is preferably contained in the portion on the magnetic layer side.

The fluorine-containing compound is a compound containing one or more fluorine atoms (F) per molecule. As the fluorine-containing compound, one kind of a commercially available compound or a compound that can be synthesized by a well-known method can be used, or two or more kinds thereof can be mixed and used in an arbitrary ratio. The fluorine atom can be contained in the fluorine-containing compound in various aspects, for example, fluorine-containing substituents such as $-CF_3$, $-CHF_2$, and $-CH_2F$. As the fluorine-containing compound, a compound having a reactive group capable of forming a crosslinked structure is preferable. Examples of the reactive group capable of forming the crosslinked structure include an epoxy group, an isocyanate group, and a hydroxy group. The use of the fluorine-containing compound having such a reactive group as a component of the magnetic layer forming composition can contribute to an increase in value of A described above. It is considered that, in a manufacturing step of the magnetic recording medium, the reactive group forms the crosslinking structure with another component (for example, a binding agent) contained in the magnetic layer, thereby making it easy for the fluorine-containing compound to remain on the surface of the magnetic layer. Accordingly, the present inventor speculates that the fluorine-containing compound can be prevented from falling off during the manufacturing step and/or from being transferred to the back coating layer side, which will be described below, thereby contributing to an increase in value of A. Note that this is merely speculation and does not limit the present invention.

One kind or two or more kinds of the fluorine-containing compounds can be used for manufacturing a magnetic recording medium. In one aspect, it is possible to produce a magnetic recording medium containing the fluorine-containing compound in the portion on the magnetic layer side, by adding the fluorine-containing compound as a component of a magnetic layer forming composition. In addition, in one aspect, a coating liquid containing a fluorine-containing compound is prepared, and the coating liquid is applied (so-called overcoat) to the surface of the magnetic layer, so that the fluorine-containing compound can be present in a portion on the magnetic layer side. From the viewpoint of suppressing an increase in value of B described above, it is preferable to manufacture the magnetic recording medium in the former aspect. Regarding the former aspect, the value of A and/or the value of B can be adjusted by an amount of the fluorine-containing compound added to the magnetic layer forming composition. In one aspect, as the amount of the fluorine-containing compound added to the magnetic layer forming composition is increased, the value of A tends to be large and the value of B tends to be small. The amount of the fluorine-containing compound added to the magnetic layer forming composition may be, for example, 0.1 parts by mass or more and 8.0 parts by mass or less, 0.1 parts by mass or more and 5.0 parts by mass or less, or 0.1 parts by mass or more and 3.0 parts by mass or less with respect to 100.0 parts by mass of the ferromagnetic powder. Note that the above range is merely an example, and the addition amount can be adjusted according to the type of the fluorine-containing compound and the like.

In addition, it is possible to produce the magnetic recording medium by using one or more kinds of other compounds by adding the fluorine-containing compound as a compound capable of functioning as a lubricant. As such a compound, one or more kinds of compounds selected from the group consisting of fatty acids and derivatives thereof (for example, fatty acid amides, fatty acid esters, and the like) can be used. By using the magnetic layer forming composition and/or the non-magnetic layer forming composition containing the compound described above, a magnetic recording medium containing the compound described above in a portion on the magnetic layer side can be produced.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. The fatty acid may be contained in the portion on the magnetic layer side in a form of a salt such as a metal salt.

Examples of the fatty acid amide include amides of the various fatty acids described above, for example, lauric acid amide, myristic acid amide, palmitic acid amide, and stearic acid amide.

Examples of the fatty acid ester include esters of the various fatty acids described above, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

A content of the fatty acid is, for example, 0.1 to 10.0 parts by mass and preferably 0.5 to 7.0 parts by mass per 100.0 parts by mass of the ferromagnetic powder as the content in the magnetic layer forming composition (or magnetic layer; the same applies hereinafter).

The content of the fatty acid in the non-magnetic layer forming composition (or non-magnetic layer; the same applies hereinafter) is, for example, 1.0 to 10.0 parts by mass and is preferably 0.5 to 7.0 parts by mass per 100.0 parts by mass of the non-magnetic powder.

The content of the fatty acid amide in the magnetic layer forming composition is, for example, 0 to 3.0 parts by mass, preferably 0.1 to 3.0 parts by mass, and more preferably 0.1 to 1.0 parts by mass per 100.0 parts by mass of the ferromagnetic powder.

The content of the fatty acid amide in the non-magnetic layer forming composition is, for example, 0.1 to 3.0 parts by mass and is preferably 0.1 to 1.0 parts by mass per 100.0 parts by mass of the non-magnetic powder.

The content of the fatty acid ester in the magnetic layer forming composition is, for example, 0 to 10.0 parts by mass and is preferably 1.0 to 7.0 parts by mass per 100.0 parts by mass of the ferromagnetic powder.

The content of the fatty acid ester in the non-magnetic layer forming composition is, for example, 0 to 10.0 parts by mass and is preferably 1.0 to 7.0 parts by mass per 100.0 parts by mass of the non-magnetic powder.

The magnetic layer described above can be provided on a surface of the non-magnetic support directly or indirectly through the non-magnetic layer.

<Non-Magnetic Layer>

The magnetic recording medium may include a magnetic layer on the non-magnetic support surface directly, or may include a non-magnetic layer containing non-magnetic powder between the non-magnetic support and the magnetic layer. The non-magnetic powder contained in the non-magnetic layer may be an inorganic powder or an organic powder. In addition, carbon black and the like can be used. Examples of the inorganic powder include powders of metal, metal oxide, metal carbonate, metal sulfate, metal nitride, metal carbide, and metal sulfide. These non-magnetic powders can be available as a commercially available product or can be manufactured by a well-known method. For details thereof, descriptions disclosed in paragraphs 0036 to 0039 of JP2010-24113A can be referred to. The content (filling percentage) of the non-magnetic powder of the non-magnetic layer is preferably 50 to 90 mass % and more preferably 60 to 90 mass %.

The non-magnetic layer contains a non-magnetic powder and can also contain a binding agent together with the non-magnetic powder. In regards to other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

The non-magnetic layer of the present invention and the present specification also includes a substantially non-magnetic layer containing a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

<Back Coating Layer>

The magnetic recording medium can also include a back coating layer containing a non-magnetic powder on a surface side of the non-magnetic support opposite to the surface side on which the magnetic layer is provided. The back coating layer can contain one or both of carbon black and an inorganic powder.

The back coating layer can include a non-magnetic powder, can include a binding agent, and can also include one or more kinds of additives. In regards to the binding agent and the additive of the back coating layer, a well-known technology regarding the back coating layer can be applied, and a well-known technology regarding the formulation of components of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

<Non-Magnetic Support>

Next, the non-magnetic support will be described. Examples of the non-magnetic support (hereinafter, simply referred to as a "support") include well-known components such as polyethylene terephthalate, polyethylene naphthalate, polyamide such as aromatic polyamide, and polyamideimide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

<Various Thicknesses>

A thickness of the non-magnetic support is preferably 3.00 to 6.00 µm, and more preferably 3.00 to 4.50 µm.

A thickness of the magnetic layer can be optimized according to saturation magnetization of the magnetic head used, a head gap length, a recording signal band, and the like. The thickness of the magnetic layer is, for example, 10 nm to 150 nm, and, from the viewpoint of realization of high-density recording, the thickness is preferably 20 nm to 120 nm, and more preferably 30 nm to 100 nm. The magnetic layer need only be at least a single layer, the magnetic layer may be separated into two or more layers having different magnetic properties, and a configuration of a well-known multilayered magnetic layer can be applied as the magnetic layer. The thickness of the magnetic layer in a case where the magnetic layer is separated into two or more layers is a total thickness of the layers.

A thickness of the non-magnetic layer is, for example, 0.01 to 3.00 µm, preferably 0.05 to 2.00 µm, and more preferably 0.05 to 1.50 µm.

A thickness of the back coating layer is preferably equal to or smaller than 0.90 µm and more preferably 0.10 to 0.70 µm.

Thicknesses of each layer and the non-magnetic support of the magnetic recording medium can be obtained by a well-known film thickness measurement method. As an example, a cross section of the magnetic recording medium in a thickness direction is exposed by a well-known method such as ion beams or microtome, and then the exposed cross section is observed with a transmission electron microscope or a scanning electron microscope. In the cross section observation, various thicknesses can be obtained as a thickness obtained at one portion of the cross section, or an arithmetic average of thicknesses obtained at a plurality of portions of two or more portions, for example, two portions which are randomly extracted. Alternatively, the thickness of each layer may be obtained as a designed thickness calculated under the manufacturing conditions.

<Manufacturing Step>

A composition for forming the magnetic layer, the non-magnetic layer, and the back coating layer usually contains a solvent together with the various components described above. As the solvent, one kind or two or more kinds of various organic solvents generally used for manufacturing a coating type magnetic recording medium can be used.

Specifically, a ketone-based solvent such as acetone, methyl ethyl ketone, methyl isobutyl ketone, diisobutyl ketone, cyclohexanone, isophorone, and tetrahydrofuran, an alcohol-based solvent such as methanol, ethanol, propanol, butanol, isobutyl alcohol, isopropyl alcohol, and methyl cyclohexanol, an ester-based solvent such as methyl acetate, butyl acetate, isobutyl acetate, isopropyl acetate, ethyl lactate, and glycol acetate, a glycol ether solvent such as glycol dimethyl ether, glycol monoethyl ether, and dioxane, an aromatic hydrocarbon solvent such as benzene, toluene, xylene, cresol, and chlorobenzene, a chlorinated hydrocarbon solvent such as methylene chloride, ethylene chloride, carbon tetrachloride, chloroform, ethylene chlorohydrin, and dichlorobenzene, N,N-dimethylformamide, hexane, and the like can be used in an arbitrary ratio. Among these, from the viewpoint of solubility of a binding agent usually used for a coating type magnetic recording medium, it is preferable that the magnetic layer forming composition contains one or more kinds of ketone-based solvents. In one aspect, as a solvent for preparing the magnetic layer forming composition, one kind or two or more kinds of solvents and a fluorine-based solvent having a boiling point lower than those of these solvents can be used in combination. It is considered that the combined use of a plurality of solvents including a fluorine-based solvent in this way can contribute to an increase in value of A described above and/or a decrease in value of B described above. Specifically, the present inventor speculates that, in a case where a coating layer of the magnetic layer forming composition is dried by a drying treatment performed in the manufacturing step of the magnetic recording medium, bleed-out of the fluorine-containing compound is promoted in a case of volatilization of the fluorine-based solvent, and the fluorine-containing compound is likely to be unevenly distributed in the extremely outermost surface layer portion including the surface of the magnetic layer. Note that this is merely speculation and the present invention is not limited to such speculation. From the viewpoint of further promoting bleed-out, it is preferable to use a fluorine-based solvent having a boiling point lower than that of the solvent used in combination in an amount of 5.0 parts by mass or more and 20.0 parts by mass or less with respect to 100.0 parts by mass of the ferromagnetic powder in a case of preparing the magnetic layer forming composition. In addition, the amount used is preferably smaller than the amount of the solvent used in combination. The amount of the solvent used in combination (in a case where two or more kinds are used, the total amount thereof) may be, for example, 100.0 parts by mass or more or 200.0 parts by mass or more or may be 800.0 parts by mass or less or 600.0 parts by mass or less with respect to 100.0 parts by mass of the ferromagnetic powder. In one aspect, a boiling point of the fluorine-based solvent having a lower boiling point than that of the solvent used in combination may be 50° C. or higher and 70° C. or lower, and the boiling point of the solvent used in combination may be 75° C. or higher and 200° C. or lower. Note that the boiling point of the solvent used for preparing the magnetic layer forming composition for manufacturing the magnetic recording medium is not limited to the above range. In the present invention and the present specification, the boiling point means a boiling point at 1 atm (1 atm is 101325 Pa (Pascal)). Specific examples of the fluorine-based solvent include Novec series manufactured by 3M. Note that the present invention is not limited to this, and one kind or two or more kinds of various fluorine-based solvents can be used.

A step of preparing each layer forming composition can usually include at least a kneading step, a dispersing step, and a mixing step provided before and after these steps, as necessary. Each step may be divided into two or more stages. Various components used in the preparation of each layer forming composition may be added at the beginning or during any step. In addition, each component may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-79274A (JP-H01-79274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (bead diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed, for example, by directly applying the magnetic layer forming composition onto the non-magnetic support or performing multilayer applying of the magnetic layer forming composition with the non-magnetic layer forming composition in order or at the same time. The back coating layer can be formed by applying a back coating layer forming composition onto a side of the non-magnetic support opposite to the side provided with the magnetic layer (or to be provided with the magnetic layer). For details of the coating for forming each layer, a description disclosed in a paragraph 0051 of JP2010-24113A can be referred to.

After the coating step, various treatments such as a drying treatment, an alignment treatment of the magnetic layer, and a surface smoothing treatment (calendering treatment) can be performed. For various steps, for example, a well-known technology disclosed in paragraphs 0052 to 0057 of JP2010-24113A can be referred to.

For example, the coating layer of the magnetic layer forming composition can be subjected to an alignment treatment, while the coating layer is wet. For the alignment treatment, various well-known technologies including a description disclosed in a paragraph 0067 of JP2010-231843A can be applied. For example, a vertical alignment treatment can be performed by a well-known method such as a method using a polar opposing magnet. In an alignment zone, a drying speed of the coating layer can be controlled depending on a temperature, an air volume of drying air and/or a transportation speed of the non-magnetic support on which the coating layer is formed in the alignment zone. In addition, the coating layer may be preliminarily dried before the transportation to the alignment zone. As the alignment condition is strengthened, a value of a square ratio of the magnetic recording medium tends to increase. The square ratio of the magnetic recording medium can be controlled by the presence or absence of the alignment treatment, the alignment condition of the alignment treatment, and the like. Examples of the alignment condition include the strength of the magnet used for the alignment treatment and the magnetic field application time.

In one application, the vertical squareness ratio of the magnetic recording medium may be 0.60 or more, preferably 0.63 or more, and more preferably 0.65 or more. In principle, the maximum value of the vertical squareness ratio is 1.00. Therefore, the vertical squareness ratio of the magnetic recording medium may be 1.00 or less, 0.95 or less, 0.90 or less, 0.85 or less, 0.80 or less, 0.75 or less, or 0.70 or less. From the viewpoint of further improving the electromagnetic conversion characteristics, a large value of the vertical squareness ratio is preferable.

In the present invention and the present specification, the vertical squareness ratio of the magnetic recording medium is a squareness ratio measured in the vertical direction of the magnetic recording medium. The vertical direction is a direction orthogonal to the surface of the magnetic recording medium, and can also be referred to as a thickness direction. The vertical squareness ratio is obtained from a vertical M-H curve. In the present invention and the present specification, the description (for example, orthogonality) regarding the direction and the angle includes a range of allowable errors in the technical field to which the present invention belongs. The range of the errors means, for example, a range of less than an exact angle ±10°, and is preferably within the exact angle ±5°, and more preferably within the exact angle ±3°.

The vertical squareness ratio is obtained by measurement performed by sweeping an external magnetic field to the magnetic recording medium in a range of a magnetic field intensity of −1197 kA/m to 1197 kA/m in a vibrating sample magnetometer. Regarding the magnetic field intensity, a conversion coefficient of unit Oe (Oersted) into SI unit A/m is $10^3/4\pi$. The range of −1197 kA/m to 1197 kA/m is synonymous with the range of −15 kAOe to 15 kAOe. In the present invention and the present specification, the measurement performed using a vibrating sample magnetometer is performed at a measurement temperature of 24° C.±1° C. The external magnetic field is swept by using a measurement sample cut out from the magnetic recording medium to be measured, according to the sweeping conditions shown in Table 4 described below, with the average number in each step=1. By sweeping the external magnetic field in this way, a hysteresis curve (referred to as "M-H curve") is obtained in the range of magnetic field intensity of −1197 kA/m to 1197 kA/m. The M-H curve obtained by the measurement performed by disposing the measurement sample on a vibrating sample magnetometer such that an application direction of the external magnetic field and a surface of the measurement sample are orthogonal to each other is referred to as a "vertical M-H curve". The measured value is obtained as a value obtained by subtracting magnetization of a sample probe of a vibrating sample magnetometer as background noise. The square ratio is a square ratio without demagnetic field correction. As a vibrating sample magnetometer (VSM), a well-known device such as the device used in Examples described below can be used. The measurement sample need only have a saturation magnetization obtained from the M-H curve thus obtained in a range of $5\times10^{-6}$ to $10\times10^{-6}$ A·m² ($5\times10^{-3}$ to $10\times10^{-3}$ emu), and the size and shape are not limited as long as the saturation magnetization in this range is obtained.

For the calendering treatment, in a case where the calendering condition is strengthened, a value of Ra of the surface of the magnetic layer of the magnetic recording medium tends to decrease. The calendering conditions include a calender pressure, a calender temperature (surface temperature of the calender roll), a calender speed, the hardness of the calender roll, and the like, as values of the calender pressure, the calender temperature, and the hardness of the calender roll are increased, the calendering treatment is strengthened, and as the calender speed is low, the calendering treatment is reinforced. For example, the calender pressure (linear pressure) can be 200 to 500 kN/m and is preferably 250 to 350 kN/m. The calender temperature (surface temperature of the calender roll) may be, for example, 85° C. to 120° C., preferably 90° C. to 110° C., and more preferably 95° C. to 110° C. The calender speed may be, for example, 50 to 300 m/min and preferably 50 to 200 m/min.

The magnetic recording medium according to one aspect of the present invention may be a tape-shaped magnetic recording medium (magnetic tape) or a disk-shaped magnetic recording medium (magnetic disk). For example, the magnetic tape is usually accommodated in a magnetic tape cartridge and the magnetic tape cartridge is mounted on a magnetic recording and reproducing device. A servo pattern can also be formed on the magnetic recording medium by a well-known method in order to enable head tracking in the magnetic recording and reproducing device. The term "formation of servo pattern" can also be referred to as "recording of servo signal". Hereinafter, the formation of the servo patterns will be described using a magnetic tape as an example.

The servo pattern is usually formed along the longitudinal direction of the magnetic tape. Examples of control (servo control) systems using a servo signal include a timing-based servo (TBS), an amplitude servo, and a frequency servo.

As shown in European Computer Manufacturers Association (ECMA)-319 (June 2001), a timing-based servo system is adopted in a magnetic tape based on a linear tape-open (LTO) specification (generally referred to as an "LTO tape"). In this timing-based servo system, the servo pattern is formed by continuously disposing a plurality of pairs of non-parallel magnetic stripes (also referred to as "servo stripes") in the longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo signal continuous in the longitudinal direction of the magnetic tape. A plurality of the servo bands are usually provided on the magnetic tape. For example, in an LTO tape, the number of the servo bands is five. A region interposed between two adjacent servo bands is referred to as a data band. The data band is formed of a plurality of data tracks and each data track corresponds to each servo track.

In one aspect, as disclosed in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a method of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding the information in the servo band, a method other than the method described above can be adopted. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As disclosed in JP2012-53940A, in a case where a magnetic pattern is transferred to, using the gap, a magnetic tape that has been subjected to vertical DC erasing, a servo signal obtained by reading the formed servo pattern has a monopolar pulse shape. Meanwhile, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing device.

[Magnetic Tape Cartridge]

Another aspect of the present invention relates to a magnetic tape cartridge including the aforementioned tape-shaped magnetic recording medium (that is, the magnetic tape).

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing device for recording and/or reproducing data on the magnetic tape, the magnetic tape is pulled out of the magnetic tape cartridge to be wound around the reel on the magnetic recording and reproducing device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing device side. During this time, data is recorded and/or reproduced as the magnetic head and the surface of the magnetic tape on the magnetic layer side come into contact with each other to be slid on each other. With respect to this, in the dual reel type magnetic tape cartridge, both reels of the supply reel and the winding reel are provided in the magnetic tape cartridge. The magnetic tape cartridge may be any of single reel type magnetic tape cartridge and dual reel type magnetic tape cartridge. The above magnetic tape cartridge need only include the magnetic tape according to one aspect of the present invention, and a well-known technology can be applied to the others.

[Magnetic Recording and Reproducing Device]

Still another aspect of the invention relates to a magnetic recording and reproducing device including the magnetic recording medium.

In the present invention and the present specification, the term "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface on the magnetic layer side and the magnetic head come into contact with each other to be slid on each other, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic recording medium, and can also be a reproducing head capable of performing the reproducing of data recorded on the magnetic recording medium. In addition, in one aspect, the magnetic recording and reproducing device can include both a recording head and a reproducing head as separate magnetic heads. In another aspect, the magnetic head included in the magnetic recording and reproducing device can have a configuration in which both an element for recording data (recording element) and an element for reproducing data (reproducing element) are included in one magnetic head. Hereinafter, the element for recording data and the element for reproducing are collectively referred to as "elements for data". As the reproducing head, a magnetic head (MR head) including a magnetoresistive (MR) element capable of sensitively reading data recorded on the magnetic recording medium as a reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. For example, a magnetic head that records data and/or reproduces recorded data (hereinafter also referred to as "recording and reproducing head") can include two servo signal reading elements, and the two servo signal reading elements can simultaneously read two adjacent servo bands. One or a plurality of elements for data can be disposed between the two servo signal reading elements.

In the magnetic recording and reproducing device, recording of data on the magnetic recording medium and/or reproducing of data recorded on the magnetic recording medium can be performed as the surface of the magnetic recording medium on the magnetic layer side and the magnetic head come into contact with each other to be slid on each other. The magnetic recording and reproducing device need only include the magnetic recording medium according to one aspect of the present invention, and a well-known technology can be applied to the others.

For example, in a case of recording data and/or reproducing recorded data, first, tracking using the servo signal is performed. That is, by causing the servo signal reading element to follow a predetermined servo track, the element for data is controlled to pass on the target data track.

Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

EXAMPLES

Hereinafter, the present invention will be described in more detail with reference to Examples. Here, the present invention is not limited to embodiments shown in Examples. "Parts" and "%" in the following description mean "parts by mass" and "mass %", unless otherwise noted. Unless otherwise noted, the following steps and evaluations were performed in the atmosphere at a room temperature (20° C. to 25° C.). "eq" in the following description is an equivalent and is a unit that cannot be converted into SI unit.

Example 1

1. Preparation of Alumina Dispersion (Abrasive Solution)

3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

2. Formulation of Magnetic Layer Forming Composition

| (Magnetic Liquid) | |
| --- | --- |
| Ferromagnetic powder (Type: see Table 5) | 100.0 parts |
| $SO_3Na$ group-containing vinyl chloride copolymer Weight-average molecular weight: 70,000, $SO_3Na$ group: 0.2 meq/g | 10.0 parts |
| $SO_3Na$ group-containing polyurethane resin Weight-average molecular weight: 70,000, $SO_3Na$ group: 0.2 meq/g | 4.0 parts |
| Fluorine-containing compound (type and content: see Table 5) | |
| Polyalkyleneimine derivative (J-2) obtained by the method described in Synthesis Example 22 disclosed in JP2015-28830A | 10.0 parts |
| Cyclohexanone | 150.0 parts |
| Methyl ethyl ketone | 170.0 parts |
| Fluorine-based solvent (type and content: see Table 5) | |
| (Abrasive Solution) | |
| Alumina dispersion prepared in the section 1 | 6.0 parts |
| (Other Components) | |
| Colloidal silica Average particle size: 100 nm | 2.0 parts |
| Stearic acid | 2.0 parts |
| Butyl stearate | 6.0 parts |
| Polyisocyanate (CORONATE (registered trademark) manufactured by Tosoh Corporation) | 2.5 parts |
| (Finishing Additive Solvent) | |
| Cyclohexanone | 300.0 parts |
| Methyl ethyl ketone | 140.0 parts |

3. Formulation of Non-Magnetic Layer Forming Composition

| Carbon black Average particle size: 20 nm | 100.0 parts |
| --- | --- |
| $SO_3Na$ group-containing vinyl chloride copolymer Weight-average molecular weight: 70,000, $SO_3Na$ group: 0.2 meq/g | 10.0 parts |
| $SO_3Na$ group-containing polyurethane resin Weight-average molecular weight: 70,000, $SO_3Na$ group: 0.2 meq/g | 4.0 parts |
| Trioctylamine | 5.0 parts |
| Phenylphosphonic acid | 1.0 part |
| Stearic acid | 2.0 parts |
| Butyl stearate | 2.0 parts |
| Cyclohexanone | 450.0 parts |
| Methyl ethyl ketone | 450.0 parts |

4. Formulation of Back Coating Layer Forming Composition

| Non-magnetic inorganic powder: α-iron oxide Average particle size (average long axis length): 0.15 μm, average acicular ratio: 7, BET specific surface area: 52 $m^2/g$ | 80.0 parts |
| --- | --- |
| Carbon black Average particle size: 20 nm | 20.0 parts |
| Vinyl chloride copolymer | 13.0 parts |
| Sulfonic acid base-containing polyurethane resin | 6.0 parts |
| Phenylphosphonic acid | 3.0 parts |
| Cyclohexanone | 355.0 parts |
| Methyl ethyl ketone | 155.0 parts |
| Stearic acid | 3.0 parts |
| Butyl stearate | 3.0 parts |
| Polyisocyanate | 5.0 parts |

5. Preparation of Each Layer Forming Composition

The magnetic layer forming composition was prepared by the following method.

The magnetic liquid was prepared by mixing various components of the magnetic liquid with a homogenizer and then dispersing the beads with zirconia beads having a bead diameter of 0.05 mm by a continuous horizontal beads mill for 10 minutes.

Using the beads mill, the above magnetic liquid was mixed with the above abrasive solution, the above other components, and the finishing additive solvent, and then treated (ultrasonically dispersed) using a batch type ultrasonic device (20 kHz, 300 W) for 0.5 minutes. Thereafter, filtration was performed using a filter having a pore diameter of 0.5 μm to prepare a magnetic layer forming composition.

A non-magnetic layer forming composition was prepared by the following method.

Various components excluding stearic acid and butyl stearate were dispersed by using a batch type vertical sand mill for 12 hours to obtain a dispersion liquid. As dispersion beads, zirconia beads having a bead diameter of 0.1 mm were used. Thereafter, the remaining components were added to the obtained dispersion liquid, and the mixture was stirred by a disper. The dispersion liquid thus obtained was filtered with a filter having a pore diameter of 0.5 μm and a non-magnetic layer forming composition was prepared.

The back coating layer forming composition was prepared by the following method.

Various components excluding stearic acid, butyl stearate, polyisocyanate, and cyclohexanone were kneaded and diluted by an open kneader, and then subjected to a dispersion treatment of 12 passes using a horizontal beads mill and zirconia beads having a bead diameter of 1 mm, by setting a bead filling percentage to 80 volume %, a circumferential speed of a rotor tip to 10 m/sec, and a retention time per pass to 2 minutes. Thereafter, the remaining components were added to the obtained dispersion liquid, and the mixture was stirred by a disper. The dispersion liquid thus obtained was filtered using a filter having a pore diameter of 1 μm to prepare a back coating layer forming composition.

6. Production of Magnetic Tape

The non-magnetic layer forming composition prepared in the section 5 was applied onto a surface of an aramid support having a thickness of 3.60 μm and was dried so that the thickness after drying is a thickness of 0.10 μm, and thus a non-magnetic layer was formed. The magnetic layer forming composition prepared in the section 5 was applied onto the surface of the formed non-magnetic layer so that the thickness after the drying is 70 nm, and a coating layer was formed. After that, the coating layer was dried. Here, no vertical alignment treatment was performed.

After that, the back coating layer forming composition prepared in the section 5 was applied onto the surface of the aramid support on a side opposite to the surface on which the non-magnetic layer and the magnetic layer were formed, and was dried, so that the thickness after the drying is 0.40 μm.

After that, a surface smoothing treatment (calendering treatment) was performed by using a calender roll configured of only a metal roll, at a speed of 100 m/sec, a linear pressure of 300 kg/cm (294 kN/m), and a calender temperature (surface temperature of calender roll) shown in Table 5.

After that, heat treatment was performed for 36 hours in an environment of an ambient temperature of 70° C., and then a slit was made to a width of ½ inches (0.0127 meters) to obtain a magnetic tape.

A thickness of each layer is a designed thickness calculated from the manufacturing conditions.

Examples 2 to 6 and 8 to 12 and Comparative Examples 1 to 9 and 11 to 13

A magnetic tape was produced in the same manner as in Example 1, except that items shown in Table 5 were changed as shown in Table 5.

In Table 5, "XS-S", "XC-SL", and "XIH160826" described in a column of the fluorine-containing compound are commercially available products as fluororesin additives from Noda Screen Co., Ltd. under the trade names "FLUORIPEL XS-S", "FLUORIPEL XC-SL" and "NEOFLUORIPEL XIH160826". These are solutions containing a fluorine-containing compound at a concentration of 5 mass % (solvent: propylene glycol monomethyl ether acetate methoxypropyl acetate). In the preparation of the magnetic liquid, each solution was used in a liquid amount at which the amount of the fluorine-containing compound in the magnetic liquid was the value shown in Table 5. In addition, the fluorine-containing compound contained in the trade name "NEOFLUORIPEL XIH160826" is a compound having an epoxy group. Meanwhile, the trade names "FLUORIPEL XS-S" and "FLUORIPEL XC-SL" include a fluorine-containing compound which does not have a reactive group capable of forming a crosslinked structure.

In Table 5, "Novec7100" described in the column of the type of the fluorine-based solvent indicates a fluorine-based solvent commercially available from 3M under the trade name "Novec7100" as a highly functional liquid.

Example 7

A magnetic tape was produced in the same manner as in Example 3 except that, after the magnetic layer forming composition was applied to form a coating layer, a magnetic field having a magnetic field intensity of 0.4 T was applied in a vertical direction with respect to the surface of the coating layer while the coating layer is in an undried state, to perform a vertical alignment treatment, and then the coating layer was dried.

In Table 5, in the column of "vertical alignment treatment", "not performed" was described for Examples and Comparative Examples in which the vertical alignment treatment was not performed as in Example 1, and "performed" was described for Example 7 in which the vertical alignment treatment was performed was performed.

Comparative Example 10

A magnetic tape was produced in the same manner as in Example 1, except for the following points.

A magnetic liquid was prepared without adding a fluorine-containing compound and a fluorine-based solvent.

The magnetic layer surface after the calendering treatment was coated (that is, overcoated) with a trade name "NEOFLUORIPEL XIH160826" manufactured by Noda Screen Co., Ltd. using a wire bar, and dried. The amount of the liquid to be applied by the overcoat was such that the amount of the fluorine-containing compound in the liquid to be applied was the amount shown in Table 5 with respect to 100.0 parts by mass of the ferromagnetic powder contained in the magnetic liquid. After that, heat treatment was performed for 36 hours in an environment of an ambient temperature of 70° C., and then a slit was made to a width of ½ inches (0.0127 meters) to obtain a magnetic tape.

In Table 5, in the column of "addition method" of "fluorine-containing compound", "magnetic liquid addition" was described for Examples and Comparative Examples in which the fluorine-containing compound was added to the magnetic liquid as in Example 1, and "overcoat" was described for Comparative Example 10.

[Ferromagnetic Powder]

In Table 5, "SrFe" described in the column of "type" of "ferromagnetic powder" indicates a hexagonal strontium ferrite powder produced as follows.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to produce an amorphous body.

280 g of the produced amorphous body was charged into an electric furnace, was heated to 635° C. (crystallization temperature) at a temperature rising rate of 3.5 ° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle containing the pulverized material, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

The hexagonal strontium ferrite powder obtained above had an average particle size of 18 nm, an activation volume of 902 nm$^3$, an anisotropy constant Ku of $2.2 \times 10^5$ J/m$^3$, and a mass magnetization σs of 49 A·m$^2$/kg.

12 mg of a sample powder was collected from the hexagonal strontium ferrite powder obtained as described above, the elemental analysis of a filtrated solution obtained by the partial dissolving of this sample powder under the dissolution conditions described above was performed by the ICP analyzer, and a surface layer portion content of a neodymium atom was obtained.

Separately, 12 mg of a sample powder was collected from the hexagonal strontium ferrite powder obtained as described above, the elemental analysis of a filtrated solution obtained by the total dissolving of this sample powder under the dissolution conditions described above was performed by the ICP analyzer, and a bulk content of a neodymium atom was obtained.

A content (bulk content) of a neodymium atom with respect to 100 atom % of an iron atom in the hexagonal strontium ferrite powder obtained above was 2.9 atom %. A surface layer portion content of a neodymium atom was 8.0 atom %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffraction beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 5, "ε-iron oxide" described in the column of "type" of "ferromagnetic powder" indicates an ε-iron oxide powder produced as follows.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at an in-furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. 50 g of ammonium sulfate was added to the obtained reaction solution, the precipitated powder was collected by centrifugal separation, washed with pure water, and dried in a heating furnace at an in-furnace temperature of 80° C. for 24 hours, and a precursor of ferromagnetic powder was obtained.

The heating furnace at an in-furnace temperature of 1000° C. was filled with the obtained precursor of ferromagnetic powder in the air atmosphere and subjected to heat treatment for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide (ε-Ga$_{0.28}$Co$_{0.05}$Ti$_{0.05}$Fe$_{1.62}$O$_3$). In addition, X-ray diffraction analysis was performed under the same condition as described above for the hexagonal strontium ferrite powder SrFe, and from a peak of an X-ray diffraction pattern, it was confirmed that the obtained ferromagnetic powder does not include α-phase and γ-phase crystal structures, and has a single-phase and ε-phase crystal structure (ε-iron oxide type crystal structure).

The obtained ε-iron oxide powder had an average particle size of 12 nm, an activation volume of 746 nm$^3$, an anisotropy constant Ku of $1.2 \times 10^5$ J/m$^3$, and a mass magnetization σs of 16 A·m$^2$/kg.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

In addition, a mass magnetization σs is a value measured at a magnetic field intensity of 1194 kA/m (15 kOe) using a vibrating sample magnetometer (manufactured by Toei Industry Co., Ltd.).

In Table 5, "BaFe" described in the column of "type" of "ferromagnetic powder" indicates a hexagonal barium ferrite powder having an average particle size (average plate diameter) of 21 nm.

[Evaluation Method]

(1) Film Quality of Magnetic Layer

For each of the magnetic tapes of Examples and Comparative Examples, a region having a size of 10 mm×10 mm at a randomly selected position on the magnetic layer surface was observed at a magnification of 50× (eyepiece lens: 10×, objective lens: 5×) with an optical microscope.

FIG. 1 shows an example (photomicrograph) of the observation results. In FIG. 1, the photomicrograph on the right side is a photomicrograph of Comparative Example 9, and it was confirmed that a recess or the like was present on the surface of the magnetic layer and the homogeneity of the film quality was low. This case is evaluated as "NG". On the other hand, the photomicrograph on the left side of FIG. 1 shows an example in which the homogeneity of the film quality of the magnetic layer was high. A case where the homogeneity is high in this way is evaluated as "OK". In Comparative Example 9, since the evaluation result of the film quality was NG, the evaluation of the electromagnetic conversion characteristics and the friction characteristics described below was not performed.

(2) Arithmetic Average Roughness Ra of Surface of Magnetic Layer

A Nanoscope4 manufactured by Veeco Instruments, Inc. was used as an AFM in a tapping mode, and RTESP-300 manufactured by BRUKER was used as a probe. A region of an area of 40 μm×40 μm on the surface of the magnetic layer of each of the magnetic tapes of Examples and Comparative Examples was measured at a scan speed (probe movement speed) at which one screen (512 pixel×512 pixel) was measured in 341 seconds, and the arithmetic average roughness Ra was obtained as described above.

(3) Fluorine Concentration A

X-ray photoelectron spectroscopy was performed regarding the magnetic layer surface of the magnetic tape (measurement region: 300 μm×700 μm) by the following method using an ESCA device, and a fluorine concentration A was calculated from the analysis result.

(Analysis and Calculation Method)

The following measurements (i) and (ii) were all performed under the measurement conditions shown in Table 1.

TABLE 1

| Device | AXIS-ULTRA manufactured by Shimadzu Corporation |
|---|---|
| Excitation X-ray source | Monochromatic Al-Kα rays (output: 15 kV, 15 mA) |
| Analyzer mode | Spectrum |
| Lens mode | Hybrid (analysis area: 300 μm × 700 μm) |
| Neutralizing electron gun for charge correction (charge neutralizer) | ON (use) |
| Photoelectron take-off angle | 10 degrees (angle between detector and sample surface) |

(i) Wide Scan Measurement

Wide scan measurement (measurement conditions: see Table 2) was performed regarding the magnetic layer surface of the magnetic tape with the ESCA device, and the types of the detected elements were researched (qualitative analysis).

TABLE 2

| Scan range | Pass energy | Energy resolution (step) | Take-in time (dwell) | Integration times (sweeps) |
|---|---|---|---|---|
| 0 to 1200 eV | 160 eV | 1 eV/step | 100 ms/step | 5 |

(ii) Narrow Scan Measurement

Narrow scan measurement (measurement conditions: see Table 3) was performed on all the elements detected in the section (i). An atomic concentration (unit: atom %) of each element detected from the peak surface area of each element was calculated using data processing software (Vision 2.2.6) attached to the device. Here, the fluorine concentration A was also calculated.

TABLE 3

| Spectrum[1] | Scan range | Pass energy | Energy resolution (step) | Take-in time (dwell) | Integration frequency (sweeps)[2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| F1s | 685 to 692 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[1]Spectra (element species) shown in Table 3 are examples, and in case where element not shown in Table 3 is detected in qualitative analysis of (i), the same narrow scan measurement is performed in scan range in which all spectra of detected element are included.
[2]Spectrum with favorable signal-to-noise ratio (S/N ratio) is measured in integration frequency of 3 times. Note that there is no effect on quantitative result even though integration frequency is 5 for all spectra.

An arithmetic average of values obtained by performing the above-mentioned process at different positions of the magnetic layer surface of the magnetic tape three times was used as the fluorine concentration A.

(4) B Calculated by Equation 1

For each of the magnetic tapes of Examples and Comparative Examples, a value of B was obtained at three randomly selected portions by the following method, and an arithmetic average of the obtained values was used as a value of B of each magnetic tape.

As a pretreatment, a diamond cutting edge was attached to a SAICAS device manufactured by Daipla Wintes Co., Ltd. and used to form an obliquely cut surface by the method described above. A penetration angle of the diamond cutting edge with respect to the surface of the magnetic layer of the magnetic tape was 0.115 degrees.

A TOF-SIMS device manufactured by ULVAC-PHI, Inc. was used as a TOF-SIMS device in a high mass resolution mode, and line profile analysis was performed by the method described above, to obtain Ftotal and Fupper by the method described above. Here, a $C_3OF_7^-$ fragment was adopted as the fluorine-based fragment. Phenylphosphonic acid was selected as a component of the non-magnetic layer, which is a portion adjacent to the magnetic layer, and a $PO_3^-$ fragment, which is a fragment confirmed to detect this component with the highest sensitivity as a result of preliminary experiment, was adopted as a fragment of this component.

B was calculated by Equation 1 from the Ftotal and the Fupper thus obtained.

$$B = (\text{Fupper}/\text{Ftotal}) \times 100 \quad \text{(Equation 1)}$$

(5) Vertical Squareness Ratio

From each of the magnetic tapes of Examples and Comparative Examples, three tape samples having a size of a short side of 12 mm×a long side of 32 mm were cut out. Each tape sample was folded once on the short side and twice on the long side, and folded to have a size of 6 mm×8 mm. The three tape samples thus folded were stacked and disposed in a vibrating sample magnetometer. The three tape samples were stacked such that the directions of the respective tape samples (the longitudinal direction and the width direction of the tape samples) coincided with each other.

TEM-WF82.5R-152 manufactured by Toei Industry Co., Ltd. was used as a vibrating sample magnetometer, and an external magnetic field was swept at a measurement temperature of 24° C., to obtain a hysteresis curve (M-H curve). The measurement for obtaining the vertical M-H curve was performed by disposing the tape sample in a vibrating sample magnetometer such that the magnetic field application direction and the surface of the tape sample were orthogonal to each other. The external magnetic field was swept according to the sweeping conditions shown in Table 4, with the average number in each step=1, starting from a magnetic field intensity of 1197 kA/m, sweeping to −1197 kA/m, and then sweeping to 1197 kA/m again. The sweeping conditions shown in Table 4 were sequentially carried out in the order from the upper row to the lower row. The total sweeping time was 312 seconds. In addition, the magnetization amount of only a measurement sample probe was measured in advance, and was subtracted as background noise in a case of measurement. For each tape sample, the saturation magnetization obtained from the vertical M-H curve thus obtained was in a range of $5\times10^{-6}$ to $10\times10^{-6}$ $A \cdot m^2$ ($5\times10^{-3}$ to $10\times10^{-3}$ emu).

The vertical squareness ratio of each magnetic tape was obtained from the vertical M-H curve obtained by the above measurement.

TABLE 4

| Upper limit field (kA/m) | Lower limit field (kA/m) | Time constant TC (sec.) | Step (kA/m) | Waiting time in each step (sec.) | Time (sec.) |
|---|---|---|---|---|---|
| 1197 | 0 | 0.1 | 6.2 | 0.1 | 27 |
| 0 | −796 | 0.1 | 0.9 | 0.1 | 120 |
| −796 | −1197 | 0.1 | 6.2 | 0.1 | 9 |
| −1197 | 0 | 0.1 | 6.2 | 0.1 | 27 |
| 0 | 796 | 0.1 | 0.9 | 0.1 | 120 |
| 796 | 1197 | 0.1 | 6.2 | 0.1 | 9 |

(6) Electromagnetic Conversion Characteristics (Signal-to-Noise-Ratio (SNR))

A SNR of each of the magnetic tapes of Examples and Comparative Examples was measured by the following method.

A signal of 27.6 MHz (line recording density of 350 kfci) was recorded and reproduced while running the magnetic tape by the following running method using a linear head. In addition, the unit kfci is a unit of linear recording density (cannot be converted to SI unit system). A reproduction signal was input to U3741 manufactured by Advantest Corporation, and a signal output (S) of a peak signal of 27.6 Hz (hertz) and an integrated noise (N) in a range of 1 MHz to 54.9 MHz excluding 27.6 MHz±0.3 MHz were measured. These ratios (S/N) were defined as SNR.

(Running Method)

A magnetic tape with a total length of 90 cm was looped and attached to a loop-type recording and reproducing device, and the magnetic tape was run at a relative speed (running speed) between the head and the magnetic tape of 2 m/sec, a back tension of 0.7 N (Newton), and a wrap angle of 3 degrees.

In Table 5, the SNR is shown as a relative value with the SNR of Comparative Example 3 as a reference (0 dB) for a magnetic tape containing a hexagonal strontium ferrite powder as a ferromagnetic powder, as a relative value with the SNR of Comparative Example 12 as a reference (0 dB) for a magnetic tape containing an ε-iron oxide powder as a ferromagnetic powder, and as a relative value with the SNR of Comparative Example 13 as a reference (0 dB) for a magnetic tape containing a hexagonal barium ferrite powder as a ferromagnetic powder. In a case where the SNR is 1.0 dB or more, it can be said that the electromagnetic conversion characteristics are excellent. The magnetic tape of Comparative Example 1 had a large friction with the head and could not be stably run, and the electromagnetic conversion characteristics could not be evaluated (indicated as "not evaluable" in Table 5).

(7) Friction Characteristics

Each magnetic tape of Examples and Comparative Examples was wound around a round bar, which was made of alumina titanium carbide (AlTiC) and had an arithmetic average roughness Ra of 15 nm and a diameter of 4 mm, as measured in a region having a size of 40 μm×40 μm using the AFM, such that the width direction of the magnetic tape was parallel to the axial direction of the round bar, the magnetic tape was slid by 45 mm per pass at a speed of 14 mm/sec in a state where a weight of 100 g was hung on one end of the magnetic tape and the other end was attached to a load cell, and the sliding of a total of 100 passes was repeated. In this case, a load during sliding of the $1^{st}$ pass and the $100^{th}$ pass at a constant velocity was detected by the load cell to obtain a measured value, and friction coefficients of the $1^{st}$ pass and the $100^{th}$ pass were calculated based on the following equation.

Friction coefficient=ln(measured value (g)/100(g))/π

The friction coefficients of the $1^{st}$ pass and the $100^{th}$ pass were calculated based on the above equation.

Regarding the evaluation result, in a case where the friction coefficient could not be evaluated due to sticking between the magnetic layer surface of the magnetic tape and the round bar during the measurement, the evaluation result was "E". In addition, since the friction coefficient corresponding to the measurement upper limit value of the load cell is 0.80, it is not possible to measure the friction coefficient exceeding 0.80. In a case where the friction coefficient exceeded the measurement upper limit value of the load cell, the evaluation result was "D". In a case where the friction coefficient was less than 0.5, the evaluation result was "A", in a case where the friction coefficient was 0.5 or more and less than 0.6, the evaluation result was "B", and in a case where the friction coefficient was in a range of 0.6 to 0.8, the evaluation result was "C". In a case where the evaluation result was A or B, it can be said that the friction characteristics are excellent.

The above results are shown in Table 5.

| | Ferromagnetic powder type Type | Fluorine-containing compound Type | Fluorine-containing compound Amount [part] | Fluorine-containing compound Additive method | Fluorine-based solvent Type | Fluorine-based solvent Amount [part] | Vertical alignment treatment | Calendar temperature (°C.) | Ra (nm) | A (%) | B (%) | Vertical squareness ratio | Film quality of magnetic layer | Electromagnetic conversion characteristic SNR | Friction characteristic |
|---|---|---|---|---|---|---|---|---|---|---|---|---|---|---|---|
| Comparative Example 1 | SrFe | Not added | 0.0 | — | Not added | 0.0 | Not performed | 110 | 1.6 | 0 | 0 | 0.63 | OK | Not evaluable | E |
| Comparative Example 2 | SrFe | Not added | 0.0 | — | Not added | 0.0 | Not performed | 100 | 2.0 | 0 | 0 | 0.63 | OK | 1.2 dB | D |
| Comparative Example 3 | SrFe | Not added | 0.0 | — | Not added | 0.0 | Not performed | 90 | 2.3 | 0 | 0 | 0.63 | OK | 0 dB | B |
| Comparative Example 4 | SrFe | XS-S | 0.1 | Magnetic liquid addition | Not added | 0.0 | Not performed | 100 | 2.0 | 1 | 37 | 0.63 | OK | 1.2 dB | D |
| Comparative Example 5 | SrFe | XS-S | 0.8 | Magnetic liquid addition | Novec7100 | 10.0 | Not performed | 100 | 2.0 | 1 | 63 | 0.63 | OK | 1.2 dB | C |
| Comparative Example 6 | SrFe | XC-SL | 0.1 | Magnetic liquid addition | Not added | 0.0 | Not performed | 100 | 2.0 | 2 | 55 | 0.63 | OK | 1.2 dB | D |
| Comparative Example 7 | SrFe | XC-SL | 0.8 | Magnetic liquid addition | Novec7100 | 10.0 | Not performed | 100 | 2.0 | 2 | 63 | 0.63 | OK | 1.2 dB | C |
| Comparative Example 8 | SrFe | XIH160826 | 0.1 | Magnetic liquid addition | Not added | 0.0 | Not performed | 100 | 2.0 | 3 | 59 | 0.63 | OK | 1.2 dB | C |
| Example 1 | SrFe | XIH160826 | 0.1 | Magnetic liquid addition | Novec7100 | 10.0 | Not performed | 100 | 2.0 | 6 | 77 | 0.63 | OK | 1.2 dB | B |
| Example 2 | SrFe | XIH160826 | 0.3 | Magnetic liquid addition | Novec7100 | 10.0 | Not performed | 100 | 2.0 | 22 | 76 | 0.63 | OK | 1.2 dB | A |
| Example 3 | SrFe | XIH160826 | 0.8 | Magnetic liquid addition | Novec7100 | 10.0 | Not performed | 100 | 2.0 | 34 | 78 | 0.63 | OK | 1.2 dB | A |
| Example 4 | SrFe | XIH160826 | 1.0 | Magnetic liquid addition | Novec7100 | 10.0 | Not performed | 100 | 2.0 | 50 | 81 | 0.63 | OK | 1.2 dB | A |
| Comparative Example 9 | SrFe | XIH160826 | 10.0 | Magnetic liquid addition | Novec7100 | 10.0 | Not performed | 100 | 3.1 | 65 | 33 | 0.63 | NG | — | — |
| Comparative Example 10 | SrFe | XIH160826 | 0.8 | Overcoat | Not added | 0.0 | Not performed | 100 | 2.0 | 41 | 100 | 0.63 | OK | 1.2 dB | D |
| Comparative Example 11 | SrFe | XIH160826 | 0.8 | Magnetic liquid addition | Novec7100 | 40.0 | Not performed | 100 | 2.4 | 39 | 89 | 0.63 | OK | −0.7 dB | A |
| Example 5 | SrFe | XIH160826 | 0.8 | Magnetic liquid addition | Novec7100 | 20.0 | Not performed | 100 | 2.1 | 40 | 90 | 0.63 | OK | 1.0 dB | A |

-continued

| | Ferromagnetic powder type Type | Fluorine-containing compound Type | Amount [part] | Additive method | Fluorine-based solvent Type | Amount [part] | Vertical alignment treatment | Calendar temperature (°C.) | Ra (nm) | A (%) | B (%) | Vertical squareness ratio | Film quality of magnetic layer | Electromagnetic conversion characteristic SNR | Friction characteristic |
|---|---|---|---|---|---|---|---|---|---|---|---|---|---|---|---|
| Example 6 | SrFe | XIH160826 | 0.8 | Magnetic liquid addition | Novec7100 | 50.0 | Not performed | 100 | 2.0 | 18 | 67 | 0.63 | OK | 1.2 dB | B |
| Example 7 | SrFe | XIH160826 | 0.8 | Magnetic liquid addition | Novec7100 | 10.0 | Performed | 100 | 2.0 | 36 | 77 | 0.63 | OK | 1.6 dB | A |
| Comparative Example 12 | ε-Iron oxide | Not added | 0.0 | — | Not added | 0.0 | Not performed | 90 | 2.3 | 0 | 0 | 0.63 | OK | 0 dB | B |
| Example 8 | ε-Iron oxide | XIH160826 | 0.1 | Magnetic liquid addition | Novec7100 | 10.0 | Not performed | 100 | 2.0 | 6 | 77 | 0.63 | OK | 1.2 dB | B |
| Comparative Example 13 | BaFe | Not added | 0.0 | — | Not added | 0.0 | Not performed | 90 | 2.3 | 0 | 0 | 0.63 | OK | 0 dB | B |
| Example 9 | BaFe | XIH160826 | 0.1 | Magnetic liquid addition | Novec7100 | 10.0 | Not performed | 100 | 2.0 | 6 | 77 | 0.63 | OK | 1.2 dB | B |
| Example 10 | SrFe | XIH160826 | 0.9 | Magnetic liquid addition | Novec7100 | 20.0 | Not performed | 100 | 2.1 | 41 | 95 | 0.63 | OK | 1.0 dB | A |
| Example 11 | SrFe | XIH160826 | 0.7 | Magnetic liquid addition | Novec7100 | 5.0 | Not performed | 100 | 2.0 | 16 | 60 | 0.63 | OK | 1.2 dB | B |
| Example 12 | SrFe | XIH160826 | 0.8 | Magnetic liquid addition | Novec7100 | 20.0 | Not performed | 100 | 1.6 | 40 | 90 | 0.63 | OK | 1.0 dB | A |

From the results shown in Table 5, it can be confirmed that the magnetic tapes of Examples have excellent electromagnetic conversion characteristics and friction characteristics.

The present invention is useful in the technical field of various magnetic recording media such as a magnetic tape for data storage.

What is claimed is:

1. A magnetic recording medium comprising:
a non-magnetic support; and
a magnetic layer containing a ferromagnetic powder,
wherein an arithmetic average roughness Ra of a surface of the magnetic layer is 2.1 nm or less,
a fluorine concentration A obtained by X-ray photoelectron spectroscopy performed on the surface of the magnetic layer at a photoelectron take-off angle of 10 degrees is 6 atom % or more and 50 atom % or less, and
B, which is calculated by Equation 1 from an integrated intensity Ftotal of fragments derived from a fluorine-containing compound obtained for an entire region in a thickness direction of a cross section of the magnetic layer by line profile analysis of TOF-SIMS and an integrated intensity Fupper of fragments derived from a fluorine compound obtained for a region from the surface of the magnetic layer to an intermediate thickness in the thickness direction of the cross section, is 67% or more and 95% or less, said intermediate thickness being defined as T/2 where T is a thickness of a magnetic layer, $B = (Fupper/Ftotal) \times 100$ (Equation 1).

2. The magnetic recording medium according to claim 1, wherein a vertical squareness ratio is 0.65 or more.

3. The magnetic recording medium according to claim 1, wherein the A is 15 atom % or more and 50 atom % or less.

4. The magnetic recording medium according to claim 1, wherein the B is 70% or more and 95% or less.

5. The magnetic recording medium according to claim 1, wherein a vertical squareness ratio is 0.65 or more, the A is 15 atom % or more and 50 atom % or less, and the B is 70% or more and 95% or less.

6. The magnetic recording medium according to claim 1, wherein the ferromagnetic powder is a hexagonal ferrite powder.

7. The magnetic recording medium according to claim 6, wherein the hexagonal ferrite powder is a hexagonal strontium ferrite powder.

8. The magnetic recording medium according to claim 7, wherein a vertical squareness ratio is 0.65 or more, the A is 15 atom % or more and 50 atom % or less, and the B is 70% or more and 95% or less.

9. The magnetic recording medium according to claim 6, wherein the hexagonal ferrite powder is a hexagonal barium ferrite powder.

10. The magnetic recording medium according to claim 9, wherein a vertical squareness ratio is 0.65 or more, the A is 15 atom % or more and 50 atom % or less, and the B is 70% or more and 95% or less.

11. The magnetic recording medium according to claim 1, wherein the ferromagnetic powder is an ε-iron oxide powder.

12. The magnetic recording medium according to claim 11, wherein a vertical squareness ratio is 0.65 or more, the A is 15 atom % or more and 50 atom % or less, and the B is 70% or more and 95% or less.

13. The magnetic recording medium according to claim 1, further comprising:
a non-magnetic layer containing a non-magnetic powder between the magnetic layer and the non-magnetic support.

14. The magnetic recording medium according to claim 1, further comprising:
a back coating layer containing a non-magnetic powder on a surface side of the non-magnetic support opposite to a surface side on which the magnetic layer is provided.

15. The magnetic recording medium according to claim 1, wherein the magnetic recording medium is a magnetic tape.

16. A magnetic tape cartridge comprising:
the magnetic recording medium according to claim 15.

17. A magnetic recording and reproducing device comprising:
the magnetic recording medium according to claim 1.

* * * * *